United States Patent Office 3,560,543
Patented Feb. 2, 1971

3,560,543
POLYIMINO ORGANOSILICON COMPOUNDS
Edwin P. Plueddemann, Midland, Mich., assignor to Dow Corning Corporation, Midland, Mich., a corporation of Michigan
No Drawing. Filed Feb. 19, 1968, Ser. No. 706,680
Int. Cl. C07f 7/10, 7/18
U.S. Cl. 260—448.2    9 Claims

ABSTRACT OF THE DISCLOSURE

Organosilicon compounds having the substituent group

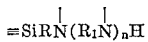

where $n$ is at least 14, are made by reacting $\equiv$SiRCl with

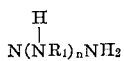

For example,

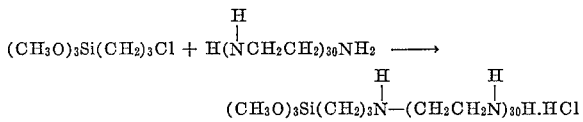

The organosilicon compounds increase the adhesion of polypropylene and other plastics to glass and glass fibers.

Organosilicon compounds having amino substituents on carbon side chains have obtained considerable commercial success. These include silanes having the aminopropyl group substituted on silicon as well as those having the aminoethylaminopropyl group. Such silanes have been employed in many applications, including those relating to the priming of surfaces to increase the receptivity of dyes and of organic plastics. U.S. Pats. 3,249,535 and 3,317,577 show organosilicon compounds having polyimine groups attached to the silicon in which the number of imine units range up to about 10.

It has been found that the compositions claimed herein give improved adhesion of certain plastics to glass and are in other ways superior to heretofore known aminosilicon compounds and the heretofore known polyimino silicon compounds.

This invention relates to compositions of matter comprising a polyimino organosilicon compound having at least one group of the formula

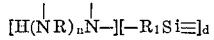

in which $d$ is an integer from 1 to 3,
R is an alkylene radical of 2 to 4 inclusive carbon atoms,
$R_1$ is a radical attached to silicon and a nitrogen atom of the polyimino group through carbon atoms and is composed of carbon, hydrogen, oxygen, the latter being in the form of

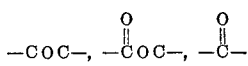

or —COH groups, and S in the form of —CSC— groups, the unsatisfied valences of the N atom being satisfied by hydrogen or

groups,
$n$ has an average value of at least 14.

The unsatisfied valences of the silicon being satisfied by hydrocarbon, fluorohydrocarbon, oxygen atoms of SiOSi— group, $OR_2$ groups in which $R_2$ is hydrocarbon or a hydrocarbon ether radical and —$N(R_3)_2$ where $R_3$ is hydrogen or a hydrocarbon radical.

Any remaining siloxane units in said organosilicon compound being of the formula

in which

Z is a hydrocarbon or fluorohydrocarbon radical, and $a$ has a value from 0 to 3 inclusive.

As can be seen from the formula the polyimino group can be either linear or branched, that is the group can contain primary, secondary and tertiary nitrogen atoms. For example, the polyimino group can be of the structure

or it can be of the structure

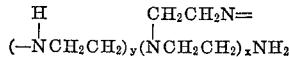

In point of fact most of the compositions of this invention will have a combination of both linear and branched polyimino groups attached to the various silicon atoms. This is true because the method of preparing the polyimino compounds which are the starting materials often give branched structures. For example, the polyimine starting materials are generally prepared by the polymerization of aziridines with ammonia and this polymerization produces both linear and branched structures. In any event the polyimino group is composed of nitrogen, the R radical and hydrogen, and the terminal group at any point will generally be an $NH_2$ group.

The R group in this invention can be any alkylene group of from 2 to 4 carbon atoms such as

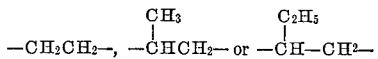

These are derived from the corresponding aziridines

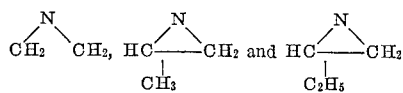

For the purpose of this invention the linking group $R_1$ between the polyimino group and the silicon is composed of carbon, hydrogen and oxygen, the latter being in the form of carbonyl, ether, ester and hydroxyl groups, or sulfur in the form of a sulfide group. Specific examples of $R_1$ are divalent hydrocarbon radicals such as the propylene radical, the (—$CH_2$—)$_6$ radical or the $$(-CH_2-)_{18}$$

radical and branched radicals such as

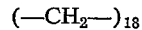

carbonyl groups such as

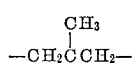

ether radicals such as —$CH_2CH_2CH_2OCH_2CH_2CH_2$—, and —$CH_2CH_2CH_2(OCH_2CH_2)_2OCH_2CH_2$—; ester groups such as

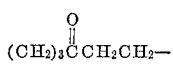

or

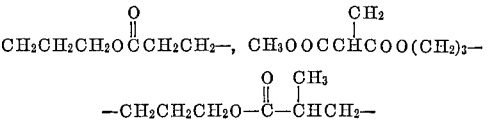

or groups containing hydroxyls such as

or a combination of such groups such as

and finally a sulfide group such as

In preparing the compositions of this invention one starts with a silicon compound reactive with the polyimine and proceeds either by coupling or addition to produce the polyimino-substituted silicon compound of this invention. This can be done by employing several types of reactive organosilicon compound. The best way of preparing the compositions of this invention is to react a chlorosubstituted organosilicon compound of the formula $ClR_1Si\equiv$ with a polyimine having an average molecular weight such that the degree of polymerization is at least 14. For example, one may react the polyimine with a chloropropyloganosilicon compound. In this process the initial reaction product is the hydrochloride salt of the polyimino silicon compound. However, one can obtain the free amine by neutralizing the hydrochloride with a base such as sodium carbonate.

Obviously one can prepare any salt of the polyimino silicon compound merely by mixing it with any suitable acid such as inorganic acids such as sulfuric, nitric, phosphonic, perchloric, hydrobromic and hydrofluoric; and organic acids such as acetic, malonic, benzoic, acrylic, benzene sulfonic, ethylphosphinic and lactic.

The second method of preparing the compounds is to react the polyimine with an organosilicon compound containing a 1,2-oxirane ring. In this case the addition of the amine to the oxirane group occurs to produce a hydroxyl containing $R_1$ group. For example, one can carry out the reaction

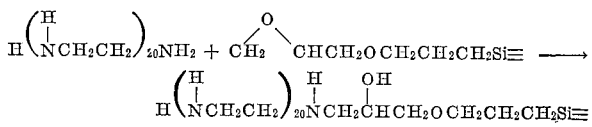

This reaction is applicable with any organosilicon compound containing a 1,2-oxirane group regardless of the structure of the remainder of the linking group $R_1$.

An additional method for preparing the compositions of this invention is to add a polyimine to a substituent group on the silicon-containing an activated terminal $CH_2=CH-$ group. These groups will be those in which the $C=C-$ is conjugated with a carbonyl group of either a ester or a ketone or is alpha to a sulfur atom as, for example, in a vinylsulfide group. Thus, for example, one can add the polyimine to groups such as

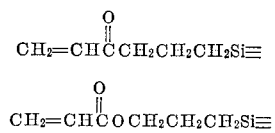

or $CH_2=CHSCH_2CH_2CH_2Si\equiv$. In all cases the imine adds to the double-bond to produce a carbon-nitrogen bond.

The starting materials employed in the invention are well-known and commercially available. As has been mentioned the polyimines are prepared by the polymerization of aziridines and are sold commercially under several trade names. The organosilicon compounds are also commercially available and are represented by such commercial compounds as gammachloropropyltrimethoxysilane or its hydrolyzate or copolymers, glycidoxypropyltrimethoxysilane or its hydrolyzate or copolymers;

or its hydrolyzates or copolymers; and sulfides such as $CH_2=CHSCH_2CH_2OCH_2CH_2CH_2Si(OCH_3)_3$ or its hydrolyzate or copolymers such as shown in U.S. Pat. 3,186,965. Addition of the polyimine to the above reactive silanes generally occurs at room-temperature although under certain conditions it is desirable to carry out the reaction at temperatures up to 100° C. and often it is desirable to employ a mutual solvent.

The polyimine silicon compounds of this invention have on the average at least 14 imine units per substituent group, preferably the substituent group should contain an average of at least 20 imine units per substituent group. That is in the formula above $n$ can be 14, but preferably should have an average value of 20 or more. It has been found that improved products are obtained when $n$ is 20 or more over products having 14 to 20 units.

From the above formula it can also be seen that the compounds covered by this invention include silanes, silcarbanes, siloxanes, silanols and alkoxysilanes as well as aminosilanes having silicon-nitrogen bonds. The soloxanes of this invention can be either homopolymeric or copolymeric siloxanes. The latter can be of two types. One in which each silicon is substituted by a polyimino group but the various polyimino groups differ; or one in which the number of substituents on the silicon atom differ. Secondly, the copolymers can be of the type in which only some silicon atoms have polyimino substituents and the remaining silicon atoms have no polyimino substituents.

Thus, we can see that in compounds in which B represents the polyimino substituted group one can have the following types of silicon compounds. Silanes of the formula $BSi(OR_2)_3$ in which $R_2$ is any hydrocarbon radical such as methyl, ethyl, isopropyl, octadecyl, vinyl, allyl, cyclohexyl, cyclohexenyl, phenyl, tolyl, xenyl, naphthyl, or benzyl; or any hydrocarbon ether radical such as $-CH_2CH_2OCH_3$, $-(CH_2CH_2O)_2C_2H_5$,

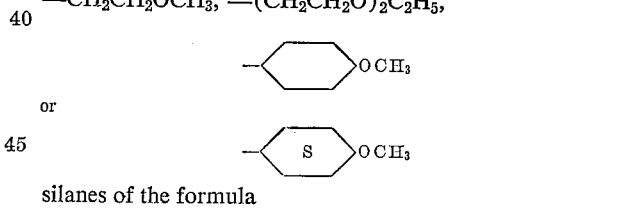

silanes of the formula

in which C is any hydrocarbon radical as defined for $R_2$ above or any fluorohydrocarbon radical such as $CF_3CH_2CH_2-$ $C_7F_{15}CH_2CH_2$ perfluorovinyl or

silanes of the formula

silanes of the formula $BSi[N(R_3)_2]_3$ in which $R_3$ is any hydrocarbon radical such as those defined for $R_2$ above; silanes of the formula

and silanes of the formula

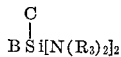

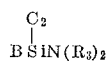

The composition can also be any siloxane having units of the formula $BSiO_{3/2}$;

and

or any siloxane having these units copolymerized with each other or with siloxane units of the type $SiO_{4/2}$, $ZSiO_{3/2}$, $Z_2SiO$ and $Z_3SiO_{.5}$ in which Z is any monovalent hydrocarbon radical such as alkyl radicals such as methyl, ethyl, isopropyl, butyl or octadecyl; any cycloaliphatic hydrocarbon radicals such as cyclopentyl, cyclohexyl, cyclohexenyl or methyl cyclohexyl; any alkenyl radical such as vinyl, allyl or hexenyl; any aromatic hydrocarbon radical such as phenyl, tolyl, xenyl or naphthyl; and any aralkyl hydrocarbon radical such as benzyl and beta-phenylpropyl. These siloxanes can be prepared either by hydrolyzing or cohydrolyzing the corresponding alkoxysilanes; or they can be prepared by adding the polyimine directly to a siloxane polymer or copolymer containing reactive groups such as the chloroalkyl group on all or some of the silicon atoms. The addition can also be made with siloxanes containing the other reactive groups, the vinyl and the oxirane groups specified above.

The organosilicon compound can also be silcarbane having any of the groups specified above attached to the silicon in which the silicon atoms in part or in whole, are connected through divalent hydrocarbon radicals such as methylene, dimethylene, tetramethylene, octadecamethylene or unsaturated divalent hydrocarbon radicals such as —CH═CH— or —$(CH_2)_4$CH═CH$(CH_2)_2$—.

The compositions of this invention are useful as intermediates in preparing other organosilicon compounds in which the amino group on the imine chain is the reactive site.

One of the primary uses for the compositions of this invention, is in the priming of surfaces in order to increase the adhesion of organic resins to siliceous and metal surfaces. In this connection the polyimine siloxanes, silcarbanes or silanes of this invention can be applied to the surface as such or they can be prepared on the surface in situ. In the latter case, the surface is first treated with one of the reactive organosilicon compounds shown above, namely, a chloroalkylorganosilicon compound, an oxirane organosilicon compound or an organosilicon compound containing an activated vinyl group. The polyimine is then applied to the surface whereupon reaction takes place between the polyimine and the functional group of the reactive organosilicon compound forming the polyimine derivative on the surface.

The application of the polyimineorganosilicon compound to the surface can be done in any convenient manner, such as by dipping, spraying or brushing, and it can be applied in the form of an aqueous solution or dispersion or as a solvent solution or dispersion.

The compounds of this invention are particularly adapted for use on glass fibers for reinforcing tires. In such an application it is generally necessary to apply a phenolic resin such as a phenol formaldehyde or resorcinol-formaldehyde resin as an additional primer. The latter materials are used in the tire cord business and are aften employed with butadiene styrene copolymers containing copolymerized vinylpyridine. The additional primer may be either a mixture of the phenol formaldehyde resin and the butadiene copolymer or each may be applied separately. Thus, in the practice of reinforcing tires one can apply the polyimines of this invention to fiberglass and then coat with the well-known phenol formaldehyde primers and then apply the rubber stock.

The compositions of this invention are also useful as coupling agents on fiberglass for use with thermoplastic resins such as nylon. In fact, the silane composition of this invention greatly improves the chopability of glass fibers for use in thermoplastic resin. This chopability is much better than that obtained with a simple amino and iminosilanes heretofore known.

The silanes of this invention can also be employed as primers on siliceous surfaces such as clay, asbestos, and silica and on substrates such as aluminum foil and other metals. In addition they can be employed as primers for bonding abrasive fillers such as silicon carbide in phenolic resin grinding wheels and in the reinforcing of thermoset resins such as epoxy and phenolic resins in which the filler is fiberglass.

Finally, the materials can be used as bonding agents in metal to metal adhesives, such as for example, in bonding aluminum foil to steel.

The following examples are illustrative only and should not be construed as limiting the invention which is properly delineated in the appended claims.

EXAMPLE 1

12 g. of polyethylene imine have a molecular weight of 600 (average degree of polymerization 14) was mixed at room temperature with 4 g. of gamma-chloropropyltrimethoxysilane. A slight exothermic reaction was noted and after standing overnight the mixture was heated at 80° C. for 1 hour. There was obtained a clear, yellow liquid which was the hydrochloride of the polyiminosilane of the average formula

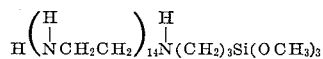

This material improved the freeze-thaw durability of concrete.

120 g. of the above polyiminosilane was mixed with 40 g. of gamma-chloropropyltrimethoxysilane and heated to 100° C. for one hour. The product was diluted with methanol to give a 50% solution, which solution has a viscosity of 25 cs. at 25° C. and a density of 0.932.

Both of the above products were diluted with water to form a clear solution of the siloxane of the average unit formula.

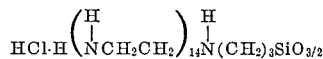

EXAMPLE 2

240 g. of a polyethyleneimine of 1200 molecular weight (average degree of polymerization 27) was mixed with 40 g. of gamma-chloropropyltrimethoxysilane and warmed at 100° C. to give an exothermic reaction during which the temperature rose to 130° C. After 30 minutes the reaction mixture was cooled and diluted to 50% by weight with methanol. A clear yellow-green solution having a viscosity of 60 cs. at room-temperature was obtained. The product had the average formula

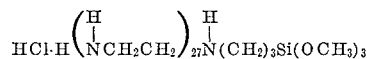

The silane was miscible in all proportions with water to give a solution of a siloxane of the average unit formula

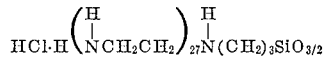

EXAMPLE 3

180 g. (0.1 m.) of a polyimine of 1800 molecular weight (D.P. 41) was mixed with 40 g. (0.2 m.) of gamma-chloropropyltrimethoxysilane in 200 g. of methanol. The solution was refluxed at 70° C. for 3 hours to obtain a clear-green solution having a viscosity of 40 cs. at room temperature and having the average formula

The methoxysilane was hydrolyzed in water to obtain a siloxane of the unit formula

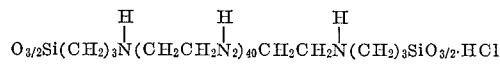
$$O_{3/2}Si(CH_2)_3\overset{H}{N}(CH_2CH_2\overset{H}{N})_{40}CH_2CH_2\overset{H}{N}(CH_2)_3SiO_{3/2} \cdot HCl$$

It should be understood that the above formula is intended to convey that there are on the average two —(CH$_2$)$_3$SiO$_{3/2}$ groups per polyimino group, but the siloxy groups are not necessarily attached to terminal N atoms.

EXAMPLE 4

Gamma-chloropropyltrimethoxysilane was applied in the form of a .5% by weight water solution to glass slides. Each slide was then treated with a 2% aqueous solution of a polyimine having 60,000 molecular weight and a polyimine having 100,000 molecular weight. This produced on the surface of the glass a siloxane of the average unit formula

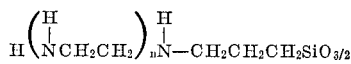
$$H\left(\overset{H}{N}CH_2CH_2\right)_n\overset{H}{N}-CH_2CH_2CH_2SiO_{3/2}$$

in which $n$ had an average value of 1365 and 2326 respectively. Each slide was then dried and polypropylene was applied to the surface and fused thereon for 5 minutes. The adhesion was checked by ascertaining how tenaciously the polypropylene adhered by attempting to remove the film with a razor blade. It was found that the film adhered quite tenaciously to both slides, as shown by the fact that the film could be stripped from the slide only with great difficulty after it had been lifted at one end with a razor blade. By contrast, slides which had been treated with the respective polyimines alone and then polypropylene fused thereon, could be stripped much more readily from the glass surface. It was also found that much more tenacious adhesion was obtained with the polyiminesilane having more than 20 ethyleneimine units than those having less than 20 said imine units.

EXAMPLE 5

To 10 g. of a 2% solution of an ethylenepolyimine having a molecular weight of 60,000 was added 2 drops of gamma-chloropropyltrimethoxysilane. The solution was applied to glass and heated for 15 minutes at 100° C. This produced a glass surface having thereon a siloxane of the average unit formula

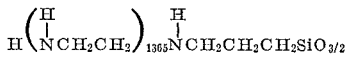
$$H\left(\overset{H}{N}CH_2CH_2\right)_{1365}\overset{H}{N}CH_2CH_2CH_2SiO_{3/2}$$

Polyethylene was applied to the coated glass and fused thereon and the adhesion was measured by the razor blade test. The film could not be stripped from the slide without cohesive failure even after one portion was lifted by cutting with a razor blade. Polyethylene fused to a glass slide that had been coated with the polyimine itself could be lifted from the glass quite readily after loosening a portion with a razor blade.

EXAMPLE 6

Glass roving was treated with a 2% solution in water-methanol of the following polyimino organosilicon compounds. The roving was dried and chopped into ¼ inch fibers. The chopped fibers were molded with nylon 6–6 in amount of 30% by weight glass. The tensile at break and flexural strength of the molded articles were determined. The results are shown below:

| Silicon compound | Tensile in p.s.i. | Flexural strength in p.s.i. | Chop ability |
|---|---|---|---|
| $(CH_3O)_3Si(CH_2)_3\overset{H}{N}CH_2CH_2CH_2$ | 19,200 | 31,100 | Fair. |
| $(CH_3O)_3Si(CH_2)_3\overset{H}{N}\left(CH_2CH_2\overset{H}{N}\right)_{14}-H \cdot HCl$ | 20,800 | 34,200 | Good. |
| $(CH_3O)_3Si(CH_2)_3\overset{H}{N}\left(CH_2CH_2\overset{H}{N}\right)_{27}-H \cdot HCl$ | 19,600 | 32,800 | Very good. |
| $(CH_3O)_3Si(CH_2)_3\overset{H}{N}\left(CH_2CH_2\overset{H}{N}\right)_{41}-H \cdot HCl$ | 19,200 | 31,700 | Do. |

This shows the better chopability of fibers coated with the polyimine silicon compounds having more than 20 imine units per group. The improved chopability is obtained without sacrificing tensile or flexural strength.

EXAMPLE 7

When the following organosilicon compounds are reacted with

$$H_2N(CH_2CH_2\overset{H}{N})_{41}H$$

in the required proportion at 80° C., the following products are obtained.

| Silicon compound | Product |
|---|---|
| $CH_2=\overset{CH_3}{\underset{\|}{C}}-\overset{O}{\overset{\|}{C}}O(CH_2)_3Si(OC_{10}H_{21})_2\overset{C_6H_4}{\|}$ | $H(\overset{H}{N}CH_2CH_2)_{41}\overset{H}{N}CH_2\overset{CH_3}{\underset{\|}{C}}H-\overset{O}{\overset{\|}{C}}O(CH_2)_3-\overset{C_6H_4}{\underset{\|}{Si}}(OC_{10}H_{21})_2$ |
| $\overset{O}{\underset{\diagdown}{CH_2}}\overset{}{CH}CH_2O(CH_2)_3Si(OCHC_2H_2OCH_3)_2\overset{CH_2CH_2CF_3}{\|}$ | $H(\overset{H}{N}CH_2CH_2)_{41}\overset{H}{N}CH_2\overset{OH}{\underset{\|}{C}}HCH_2O(CH_2)_3-\overset{CH_2CH_2CF_3}{\underset{\|}{Si}}(OCH_2CH_2OCH_3)_2$ |
| $CH_2=CHS(CH_2)_3Si(OC_6H_4)_2\overset{CH_3}{\|}$ | $H(\overset{H}{N}CH_2CH_2)_{41}\overset{H}{N}CH_2CH_2S(CH_2)_3\overset{CH_3}{\underset{\|}{Si}}(OC_6H_4)_2$ |
| $Si[OSi(CH_2)_{18}Cl]_4\overset{(CH_3)_2}{\|}$ | $Si[O\overset{(CH_3)_2}{\underset{\|}{Si}}(CH_2)_{18}\overset{H}{N}(CH_2CH_2\overset{H}{N})_{41}H \cdot HCl]_4$ |
| $Cl(CH_2)_3Si[(OSi)_{20}OH]_3\overset{CH=CH_2}{\underset{\|}{\underset{CH_3}{\|}}}$ | $HCl \cdot H(\overset{H}{N}CH_2CH_2)_{41}\overset{H}{N}(CH_2)_3Si[(O\overset{CH=CH_2}{\underset{\|}{Si}})_{20}-OH]_3\overset{}{\underset{CH_3}{\|}}$ |

| Silicon compound | Product |
|---|---|
| $CH_2=CHC(CH_2)_3\overset{O}{\underset{\|}{C}}iO\begin{bmatrix}(CH_3)_2\\ \begin{matrix}CF_3\\CH_2\\CH_2\\SiO\\CH_3\end{matrix}\end{bmatrix}_{30}Si(CH_3)_3$ | $H(\overset{H}{\underset{\|}{N}}CH_2CH_2)_{41}\overset{H}{\underset{\|}{N}}CH_2CH_2\overset{O}{\underset{\|}{C}}(CH_2)_3-\overset{(CH_3)_2}{\underset{\|}{Si}}O\begin{bmatrix}CF_3\\CH_2\\CH_2\\SiO\\CH_3\end{bmatrix}_{30}Si(CH_3)_3$ |
| $Cl(CH_2)_3\overset{(CH_3)_2}{\underset{\|}{Si}}CH_2CH_2\overset{(CH_3)_2}{\underset{\|}{Si}}OCH_3$ | $HCl.H(\overset{H}{\underset{\|}{N}}CH_2CH_2)_{41}\overset{H}{\underset{\|}{N}}(CH_2)_3\overset{(CH_3)_2}{\underset{\|}{Si}}CH_2CH_2\overset{(CH_3)_2}{\underset{\|}{Si}}OCH_3$ |
| 50 mol percent $C_6H_4SiO_{3/2}$ | 50 mol percent $C_6H_4SiO_{3/2}$ |
| 40 mol percent $(CH_3)_2SiO$ | 40 mol percent $(CH_3)_2SiO$ |
| 10 mol percent $Cl(CH_2)_3SiO_{3/2}$ | 10 mol percent $HCl.H(\overset{H}{\underset{\|}{N}}CH_2CH_2)_{41}\overset{H}{\underset{\|}{N}}(CH_2)_3SiO_{3/2}$ |
| $\overset{O}{\underset{\diagdown\diagup}{C}}H_2CHCH_2O(CH_2)_3Si(\overset{H}{\underset{\|}{N}}C_4H_9)_3$ | $H(\overset{H}{\underset{\|}{N}}CH_2CH_2)_{41}\overset{H}{\underset{\|}{N}}CH_2\overset{OH}{\underset{\|}{C}}HCH_2O(CH_2)_3Si-(\overset{H}{\underset{\|}{N}}C_4H_9)_3$ |
| $C_2H_5OOC\overset{CH_2}{\underset{\|}{C}}COO(CH_2)_3Si(OCH_3)_2\overset{C_{18}H_{37}}{\underset{\|}{}}$ | $H(\overset{H}{\underset{\|}{N}}CH_2CH_2)_{41}\overset{H}{\underset{\|}{N}}CH_2\overset{C_{18}H_{37}}{\underset{\|}{C}}HCOO(CH_2)_3Si(OCH_3)_2$<br>$\overset{\|}{C}OOC_2H_5$ |

EXAMPLE 8

When the following polyamines are reacted with gamma-chloropropyltrimethoxysilane in the manner of Example 1, the following silanes are obtained:

| Polyimine | Silane |
|---|---|
| $H_2N(CH_2CH_2N-)_5(CH_2CH_2N)_{30}H$<br>$\begin{bmatrix}CH_2\\CH_2\\NH\\H\end{bmatrix}_2$ | $HCl.H_2N(CH_2CH_2N-)_5(CH_2CH_2N)_{30}-(CH_2)_3Si(OCH_3)_3$<br>$\begin{bmatrix}CH_2\\CH_2\\NH\\H\end{bmatrix}_2$ |
| $H(\overset{H}{\underset{\|}{N}}\overset{CH_3}{\underset{\diagup}{C}}HCH_2)_{25}NH_2$ | 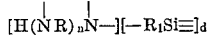 |
| $H(\overset{H}{\underset{\|}{N}}-\overset{C_2H_5}{\underset{\|}{C}}HCH_2)_{30}NH_2$ | 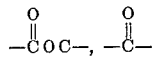 |

That which is claimed is:

1. A composition of matter comprising a polyimino organosilicon compound having at least one group of the formula $$[H(\overset{|}{N}R)_n\overset{|}{N}-][-R_1Si\equiv]_d$$

in which $d$ has a value from 1 to 3, R is an alkylene radical of 2 to 4 inclusive carbon atoms, $R_1$ is a radical attached to silicon and a nitrogen atom of the polyimino group through carbon atoms, $R_1$ being selected from the group consisting of hydrocarbon radicals and radicals composed of carbon, hydrogen and atoms selected from the group consisting of O and S, the O being in the form of —COC—, $$-\overset{O}{\underset{\|}{C}}OC-, -\overset{O}{\underset{\|}{C}}-$$

or —COH groups and the S being in the form of ≡CSC≡ linkages, $R_1$ containing no more than 18 carbon atoms, the unsatisfied valences of the nitrogen being satisfied by hydrogen or RN= groups, $n$ has an average value of from 14 to about 2326, the unsatisfied valences of the silicon being satisfied by substituents selected from the group consisting of hydrocarbon radicals of no more than 18 carbon atoms, fluoro-hydrocarbon radicals of no more than 18 carbon atoms, oxygen atoms of SiOSi linkages, $OR_2$ groups in which $R_2$ is a hydrocarbon or a hydrocarbon ether radical both of no more than 18 carbon atoms and —$N(R_3)_2$ groups in which $R_3$ is hydrogen or hydrocarbon radicals of no more than 18 carbon atoms, there being at least one SiOSi linkage, $OR_2$ group or $N(R_3)_2$ group per silicon atom in said polyimino organosilicon compound; any remaining siloxane units in said organosilicon compound being of the formula $$Z_aSiO_{\frac{4-a}{2}}$$

in which Z is a hydrocarbon or fluorohydrocarbon radical both of no more than 18 carbon atoms and $a$ has a value from 0 to 3 inclusive.

2. A composition in accordance with claim 1 in which $R_1$ is a hydrocarbon radical.

3. A composition in accordance with claim 2 in which the remaining valences of the silicon are satisfied by alkoxy radicals.

4. A composition of claim 1 of the formula

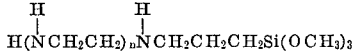

5. A composition of claim 1 in which $n$ has an average value of at least 20.

6. A composition of claim 5 in which the remaining valences of the silicon are alkoxy radicals.

7. A composition of claim 5 having the formula

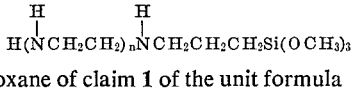

8. A siloxane of claim 1 of the unit formula

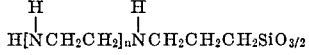

9. A siloxane of claim 1 of the unit formula
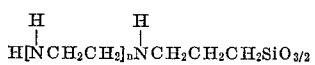
in which $n$ has a value of at least 20.
References Cited
UNITED STATES PATENTS
| | | | |
|---|---|---|---|
| 3,046,250 | 7/1962 | Plueddemann | 260—448.2X |
| 3,152,161 | 10/1964 | Lisanke et al. | 260—448.2(N) |
| 3,249,535 | 5/1966 | Keil | 260—448.2X |
| 3,317,577 | 5/1967 | Ryan | 260—448.2(N) |
| 3,347,896 | 10/1967 | Kanner | 260—448.2(N) |
| 3,460,981 | 8/1969 | Woodward et al. | 260—448.2X |
TOBIAS E. LEVOW, Primary Examiner
P. F. SHAVER, Assistant examiner
U.S. Cl. X.R.
117—124, 126, 135, 161; 260—37, 46.5, 448.8